United States Patent Office 3,038,955
Patented June 12, 1962

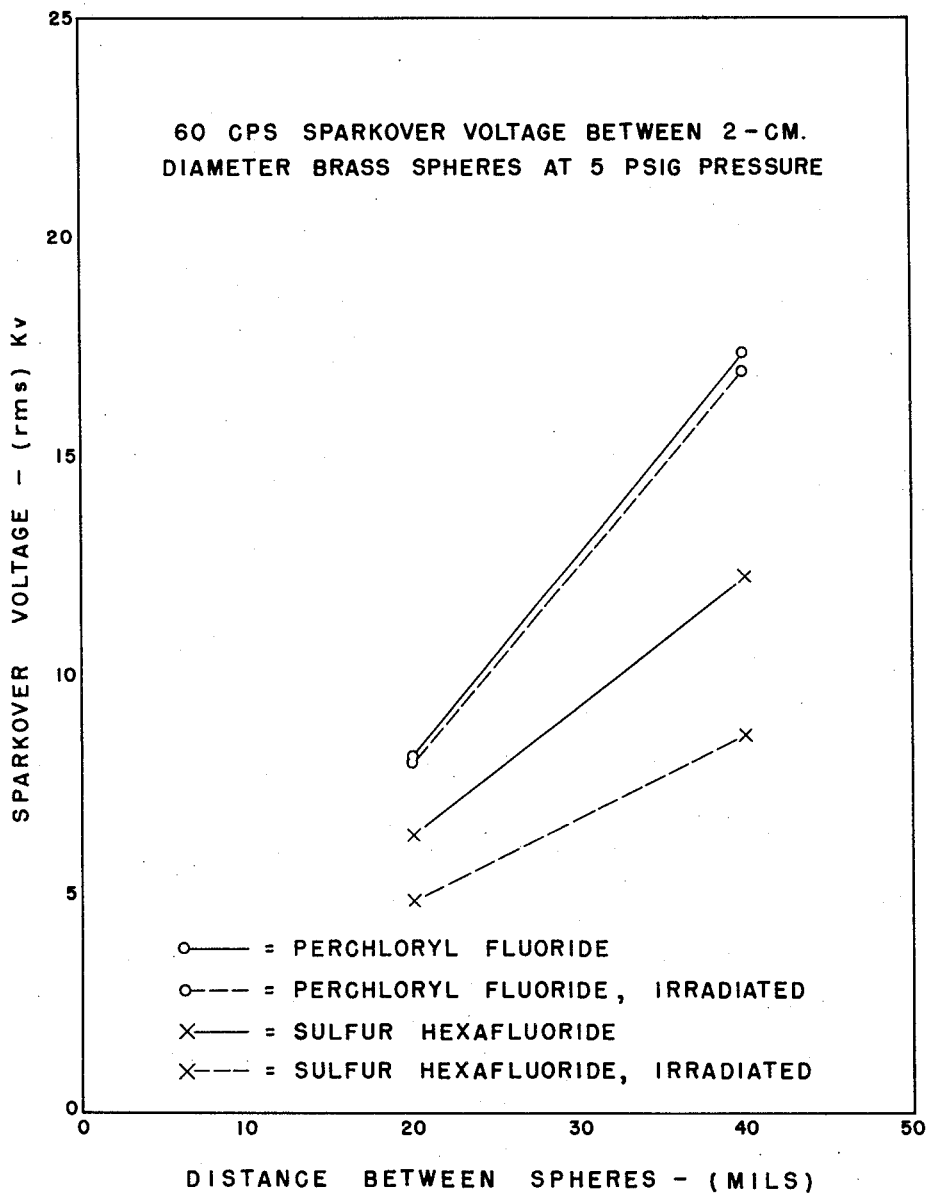

3,038,955
DIELECTRIC MATERIAL INCLUDING
PERCHLORYL FLUORIDE
John F. Gall, Narberth, Penn Valley, Pa., assignor to
Pennsalt Chemicals Corporation, a corporation of
Pennsylvania
Filed Nov. 29, 1956, Ser. No. 625,112
12 Claims. (Cl. 174—17)

This invention concerns dielectric materials. More particularly it concerns dielectric materials comprising perchloryl fluoride.

The insulation problem is a major consideration in the design and operation of modern electrical equipment for high voltages at both high and low frequencies, and the need for new and more effective materials with dielectric properties is a continuing one.

The basic functions of an electrical insulating material are, among others, to increase electrical capacity, to act as a discharge barrier, to act as a wave guide or reflector, and to act as a barrier or envelope in both an electrical and thermal sense.

Dielectric materials are used in power generating equipment, high voltage transformers and switch-gears; in primary distribution systems; in high and low voltage transformers; in coaxial telephone cables carrying both signal and power currents; in underground lines of high voltage cables carrying up to 138 kv.; and in overhead transmission lines carrying up to 220 kv. Dielectric materials are also used in the secondary distribution system from substations and pole transformers. Dielectric materials find uses in special fields of radar, electronic type communication, ordnance and television installations, and in the X-ray field. The operation of the electrical and electronic equipment under conditions of irradiation presents a new and growing problem. In many types of electrical equipment decreased costs and improved design would follow the development of better insulation for high total voltages. The process of my invention is generally useful in all these fields of application.

Insulating, or dielectric, materials are of solid, liquid and gaseous forms. This invention is concerned with a gaseous form of dielectric material, perchloryl fluoride, and its compositions with other dielectric gases.

Dielectric strength is a common measure of the usefulness of an insulating material for electrical applications. Dielectric strength as used in this specification is defined as the power of a dielectric to resist stress caused by induction across it, as measured by the difference of potential necessary to break through it by disruptive discharge. A dielectric is defined as any substance that transmits electrical forces or effects by induction rather than by conduction. In terms of measurement, the dielectric strength of a material is the electrical field strength expressed as volts per mil that must be applied to cause a disruptive discharge (arc or spark) or accumulative current through the body of the material.

A wide and growing range of applications exists for which a gaseous dielectric material may be advantageously used. In systems involving rapidly moving or quick acting parts a medium with low windage losses or freedom from inertia with maximum electrical strength is desirable. In other applications, weight, volume and cost of the insulating material are important factors. The fact that the dielectric strength of insulating gases under certain special conditions, especially at high frequencies, can be superior to either liquid or solid insulating materials makes such gases very promising insulating media. This fact is especially true of the dielectric gas of my invention.

A further advantage of a gaseous insulating material is its low dielectric loss factor. This is the property of a dielectric to dissipate energy within the dielectric due to a sinusoidal electric stress. A low dielectric loss factor is evidence of the ability of the dielectric to minimize power losses from a conductor, such as a cable or transformer coil, when such is surrounded by the dielectric. A low dielectric loss factor is a feature of a dielectric gas comprising perchloryl fluoride.

The commonest gaseous insulating material is, of course, air. Other well-known dielectric gases are nitrogen, many of the fluorocarbons, and sulfur hexafluoride. Sulfur hexafluoride is recognized as having excellent dielectric properties. I have now found that perchloryl fluoride is superior in this respect even to sulfur hexafluoride. I have found that perchloryl fluoride, or a mixture of perchloryl fluoride with one or more other gaseous materials, is an excellent dielectric material, particularly adapted for use in dry type installations where a gaseous insulating material is required.

My invention is directed to processes, compositions and electrical and electronic systems making use of the valuable insulating property of perchloryl fluoride.

The accompanying drawing shows graphically the advantageous dielectric properties of perchloryl fluoride compared to the well known dielectric properties of sulfur hexafluoride. The significance of the chart lines is made clear by the text of the specification and particularly by the examples.

Perchloryl fluoride, $ClO_3F$, is a colorless gas with a characteristic smell. On cooling it forms a colorless liquid which boils at $-47.5°$ C., and freezes at $-146°$ C. Its vapor pressure at room temperature is about 150 p.s.i.g. and at $130°$ F. is about 300 p.s.i.g. It is only moderately toxic, as revealed by tests on animals. Thermally, perchloryl fluoride is quite stable, withstanding temperatures of at least $900°$ F. without signs of decomposition. Chemically, perchloryl fluoride is an oxidizing agent and will, like oxygen, support combustion. The compound is readily compressed and stored in steel cylinders.

The dielectric strength of a chemical compound is not generally predictable from its chemical and physical characteristics. The chemistry of dielectric gases in relation to dielectric strength has been a matter for speculation and hypothesis for many decades. The dielectric strengths of compounds have been studied by many researchers and comparative data on vapors and gases which are used as dielectric materials are plentiful in the technical literature. It is known that dielectric strengths of compounds which are closely related chemically may vary widely. Some generalizations seem to be valid at least for compounds which have been investigated; for example, most materials with high relative dielectric strengths contain halogens or sulfur, whereas oxygen and materials containing oxygen have, in general, relatively low dielectric strengths. Although the presence of these components does not insure high strength, certain groups of atoms such as the amine group and the benzene ring seem to be detrimental. Molecular weight is not a controlling factor. The degree of correlation with heat of formation is not particularly suggestive. The almost invariable rise in dielectric strength in a given hydrocarbon when, for instance, methane, $CH_4$, is converted to a halogen methane, such as $CCl_4$, has long been noted. The fluorocarbons based on methane and ethane are, of course, examples of this class. Other fluorocarbons are members of homologous series, and the chemical similarity of $C_2F_6$, $C_3F_8$ and $C_4F_{10}$ is so great that a simple linearity between the dielectric strength and the increasing densities of these gases has been found. However, when gases are more distinctly different chemically, an accounting of relative dielectric strengths becomes more difficult. The case of $CF_4$ when compared with other stronger fluorocarbons such as $CCl_2F_2$ is illustrative. On the basis of symmetry, bond energies, electron affinities, and quantum mechanics, $CF_4$ should be a strong dielectric gas, but it is only slightly better than nitrogen. Furthermore sulfur chloride, methyl bromide, ethyl ether, and ethyl alcohol, all distinctly different chemically, have been found to have the same strength as nitrogen. Helium, a chemically very inert gas, has the lowest strength of any of the materials under discussion. In view of the above facts, my finding that perchloryl fluoride, chemically an oxidant and high in oxygen content, has superior dielectric strength, superior even to that of sulfur hexafluoride, was unpredictable and unexpected.

According to the process of my invention, perchloryl fluoride may be used alone as a dielectric material. However, it may also be mixed with one or more other gases to form mixtures of various dielectric strengths. For example, perchloryl fluoride may be mixed with air, nitrogen, fluorocarbons, $BF_3$, or $SF_6$ or mixtures of these gases to form dielectric gases of various dielectric properties. A mixture of perchloryl fluoride with another dielectric gas, sulfur hexafluoride, for example, is prepared by blending the gases in such proportions that the other gas is present in any desired proportion of from 1 to 99% by volume of the final mixture.

Perchloryl fluoride, or mixtures comprising it, may be used as a dielectric material in electrical power distributing systems, in electric current transformers, in electric current transmission switch gear, in X-ray equipment and in many other types of equipment at both high and low frequencies where a dry type dielectric material is or can be advantageously used. I have found that perchloryl fluoride is especially advantageous for use under conditions where atomic radiation is present. In respect to its favorable performance under gamma radiation, I have found perchloryl fluoride superior to sulfur hexafluoride and nitrogen by a considerable margin. Sulfur hexafluoride has been used as a standard in my examples since it is recognized as one of the best of the gaseous dielectric materials previously known.

The dielectric material of my invention may be used in both outdoor and indoor installations. For outdoor equipment service it is customary to select a gas that does not require special heating auxiliaries to prevent condensation at low ambient temperatures. The low boiling point of perchloryl fluoride makes it ideal for cold climate service. Another very important requirement of an insulating gas is that the gas have sufficient impulse strength to protect the apparatus from failure caused by lightning strokes on the transmission lines to which the apparatus is connected. By comparison with sulfur hexafluoride and other dielectric gases the higher dielectric strength of perchloryl fluoride should give it a superior rating in this respect as compared to presently used gases. Compressed gases have been rather slow in finding applications in high voltage apparatus, especially of the outdoor type, because, to compete with liquid insulation, such apparatus had to be operated at relatively high pressures to have the dielectric strength of the former. However, the most serious drawback has been the liquefaction that occurs at temperatures within the outdoor ambient range. The boiling point of perchloryl fluoride and its vapor pressure at the ranges of temperature experienced in both indoor and outdoor service where gaseous dielectric materials are required make it a superior material for such uses.

Although I prefer to use perchloryl fluoride in its gaseous form in the dielectric compositions of my invention, I also contemplate using liquefied perchloryl fluoride alone or with at least one other non-solid dielectric material in said compositions where service conditions permit use of a pressurized liquid.

In carrying out the process of my invention perchloryl fluoride or a mixture of perchloryl fluoride containing at least one other gaseous material is used to blanket, as by filling, surrounding and/or enclosing, electrical and/or electronic equipment in an atmosphere of the dielectric gas or gases.

The process requires that the equipment or especially critical parts of it be enclosed and subjected to an atmosphere of perchloryl fluoride or of a mixture of gases containing perchloryl fluoride. If elevated temperatures are to be experienced in operation of the protected equipment, the enclosure should be designed to withstand the vapor pressure attained by perchloryl fluoride, and the mixtures thereof with other gases which may be used, at the elevated temperatures.

The dielectric material of my invention is preferably used in the arcing zone of electrical equipment where high voltages are encountered, such as in switch-gear, or circuit-breakers. It is also preferably used in place of oil in step-down transformers where high voltages are involved. In circuit-breaker service using my dielectric material, the circuit breaker is placed in a sealable pressure type container through which the current lead wires to and from the circuit breaker pass. The container is then charged with perchloryl fluoride to obtain a pressure of from at least slightly above atmospheric up to 150 p.s.i.g. or higher and preferably from 5 to 60 p.s.i.g. at room temperature. During operation of the circuit-breaker, as the circuit is interrupted or contact made, the perchloryl fluoride serves to dampen the arc developed by the metal contacts, minimizing the destructive effects of the arcing to the contacts and the equipment. Because of its high thermal stability the perchloryl fluoride is capable of withstanding repeated arcings without breakdown of the compounds or damage to the equipment. Mixtures of perchloryl fluoride with sulfur hexafluoride or other dielectric gases may also be used in this manner. Since no carbon is present in the perchloryl fluoride molecule, no carbonization of the contacts can result from use of perchloryl fluoride. This property is a distinct advantage of perchloryl fluoride over the fluorocarbon type dielectric gases and liquids.

The chemical inertness of perchloryl fluoride towards materials of construction of electrical equipment is further advantageous in a dielectric use because of the low corrosiveness of the resulting dielectric material in service at both high and low temperatures and even in the presence of traces of moisture. Traces of decomposition products may be removed from the dielectric composition by use of activated alumina or other adsorbent as is customarily done, for example, when sulfur hexafluoride is used as a dielectric material.

The use of perchloryl fluoride in a high voltage electric current transformer installation may be carried out in a similar manner as described for the circuit breaker. The transformer is generally of dry-type construction, i.e. of a design built for use with a gaseous dielectric material. Perchloryl fluoride is charged into the transformer to a desired pressure. The ambient temperature service to which the unit will be submitted will influence the pressure to which it will be charged with the perchloryl fluoride or a mixture thereof with at least one other dielectric gas. A pressure from slightly above atmospheric to about 150 p.s.i.g., or higher may be used, although pressures of 30-60 p.s.i.g. are preferred.

In electronic service, perchloryl fluoride or mixtures comprising perchloryl fluoride may be used to advantage in gas-filled electronic tubes where inert gases of high dielectric strength are required. The usual practices employed in the filling of such tubes may be used with perchloryl fluoride and its mixtures with other gases.

The use of perchloryl fluoride in power transmission systems such as encased cables carrying high voltages may be carried out in the usual manner employed for insulating such systems with an insulating gas.

At higher voltages the gas in maintained at higher pressures in order to suppress or prevent ionization.

The valuable dielectric properties of perchloryl fluoride are shown by the following examples. The tests were carried out in accordance with accepted procedures used for determining such properties.

EXAMPLE 1

Perchloryl fluoride was compared with several other, well-known, dielectric materials in order to determine its relative order of dielectric strength compared to these materials. The gases were tested at room temperature using a high frequency Tesla sparker and a grounded metallic surface in an atmosphere of the gas in a closed container. The distance between the metal surface and the end of the sparker was measured. A short distance is indicative of high resistance to conductance of current and indicates high dielectric strength. The results of the tests are shown in Table 1.

*Table 1*

| Dielectric material: | Distance in millimeters |
|---|---|
| Perchloryl fluoride | 9 |
| Sulfur hexafluoride | 11 |
| Dichlorodifluoromethane | 11–11.5 |
| Nitrogen trifluoride | 12 |
| Trifluoroethylchloride | 12 |
| Purified air (dried) | 19 |
| Nitrogen | 25–26 |

It should be noted that this relative order of dielectric strengths is merely a rough measure, but it does establish the position of perchloryl fluoride as a dielectric material compared to the other materials tested.

EXAMPLE 2

The dielectric strength of perchloryl fluoride at 5 p.s.i.g. pressure at 60 cycles per second between 2-cm. diameter spherical brass electrodes was measured and found to be 410 volts R.M.S./mil. Under identical conditions, sulfur hexafluoride was found to have a breakdown potential of only 320 volts R.M.S./mil. "R.M.S." means the "root mean square" voltage. This "effective voltage" is determined by dividing the peak voltage by square root of two. The significance of this result is that it shows that a higher electrical potential is required to cause a spark to pass through perchloryl fluoride than through sulfur hexafluoride at the same gap distance.

EXAMPLE 3

Sparkover voltages for perchloryl fluoride, nitrogen and $SF_6$ were determined at 60 c.p.s. between 2-cm. diameter brass spheres at 5 p.s.i.g. pressure. The results are shown below in Table 2.

*Table 2*

| Separation, Mils | Sparkover—Volts | | |
|---|---|---|---|
| | Nitrogen | $SF_6$ | PF |
| 20 | 3.8 | 6.4 | 8.2 |
| 30 | 4.4 | 9.4 | 12.5 |
| 40 | 5.8 | 12.3 | 16.4 |

The resistance of perchloryl fluoride to the flow of electrical current at each of the gap distances is thus shown to be remarkably higher.

EXAMPLE 4

Using the same apparatus as in Example 3, the sparkover voltages of the same gases as in Example 3 were measured in the presence of irradiation from a Cobalt-60 source. The gap between the two brass spheres was irradiated with one millicurie from a Cobalt-60 source place 4½ inches from the center of the gap. The results are shown in Table 3.

*Table 3*

| Separation, Mils | Sparkover—Volts | | |
|---|---|---|---|
| | Nitrogen | $SF_6$ | PF |
| IRRADIATED | | | |
| 20 | 2.7 | 4.9 | 8.1 |
| 30 | 3.6 | 6.7 | 11.5 |
| 40 | 4.4 | 8.7 | 15.7 |

The significance of the data in Table 3 is more striking in showing the stability of perchloryl fluoride to irradiation when the data is compared with the data in Table 2. In Table 4 are shown the ratios of sparkover voltages with irradiation to sparkover voltages without irradiation.

*Table 4*

| Separation, Mils | Sparkover voltage ratios, irradiated: radiated | | |
|---|---|---|---|
| | Nitrogen | $SF_6$ | PF |
| 20 | 0.73 | 0.77 | 0.99 |
| 30 | 0.82 | 0.75 | 0.92 |
| 40 | 0.76 | 0.71 | 0.96 |

The superior stability of perchloryl fluoride under irradiation conditions is evident by the fact that perchloryl fluoride sustained the least break-down of the three gases irradiated. A further comparison between perchloryl fluoride and $SF_6$ sparkover voltages is shown in Table 5 where the ratios of perchloryl fluoride, PF, sparkover voltages to sulfur hexafluoride, $SF_6$, sparkover voltages are tabulated.

*Table 5*

| Separation, Mils | Sparkover—Volts | |
|---|---|---|
| | Irradiated, PF:$SF_6$ | Not Irradiated, PF:$SF_6$ |
| 20 | 1.65 | 1.28 |
| 30 | 1.72 | 1.33 |
| 40 | 1.81 | 1.33 |

Sparkover voltages at different gap distances for both irradiated and non-irradiated perchloryl fluoride and sulfur hexafluoride are shown in the drawing. The greater dielectric strength of perchloryl fluoride, as well as its greater resistance to the influence of radiation compared to sulfur hexafluoride, is evident.

Many widely different embodiments of this invention may be made without departing from the scope and spirit of it and it is to be understood that my invention also includes such embodiments and is not to be limited by the above description.

I claim:

1. A process for insulating electrical equipment having a sealed casing, electricity conducting means therein physically insulated from the casing, and space between the casing and said means which comprises further insulating the current transmitting means by filling said space with an atmosphere of a dielectric material comprising perchloryl fluoride in an amount at least 1% by volume of said material and maintaining said material under superatmospheric pressure during operation of the equipment.

2. The process according to claim 1 wherein said electrical equipment is a circuit-breaker.

3. The process according to claim 1 wherein said electrical equipment is a transformer.

4. The process according to claim 1 wherein said electrical equipment is a cable.

5. The process of claim 1 carried out in the presence of atomic radiation.

6. A process for insulating electronic equipment having a sealed casing, electron transmitting means therein physically insulated from the casing, and space between the casing and said means which comprises further insulating the electron transmitting means by filling said space with an atmosphere of a dielectric material comprising perchloryl fluoride in an amount at least 1% by volume of said material and maintaining said material under superatmospheric pressure during operation of the equipment.

7. The process according to claim 6 wherein said electronic equipment is an electronic tube.

8. An electrical apparatus comprising the combination of a sealed casing, an electrical device in said casing and a gaseous insulating medium comprising perchloryl fluoride in an amount at least 1% by volume of said medium within said casing in contact with elements of said device.

9. The apparatus of claim 8 wherein said gaseous insulating medium consists of perchloryl fluoride in admixture with at least one other non-solid dielectric material.

10. In electrical equipment having a sealed casing and electricity conducting means therein spaced from the casing, the combination with said casing of a dielectric material comprising perchloryl fluoride in an amount at least 1% by volume of said material confined within said casing to insulate said means during operation.

11. In electronic equipment having a sealed casing and electron transmitting means therein spaced from the casing, the combination with said casing of a dielectric material comprising perchloryl fluoride in an amount at least 1% by volume of said material confined within said casing to insulate said means during operation.

12. A dielectric material consisting of perchloryl fluoride and from 1 to 99% by volume of sulfur hexafluoride.

References Cited in the file of this patent

UNITED STATES PATENTS

| | | |
|---|---|---|
| 2,118,667 | Domenach | May 24, 1938 |
| 2,561,738 | Hill | July 24, 1951 |

FOREIGN PATENTS

| | | |
|---|---|---|
| 171,110 | Austria | Apr. 25, 1952 |

OTHER REFERENCES

Mellor: Inorganic and Theoretical Chemistry 1956, Supplement II, Part I, pages 183, 184.

Miller et al.: "Inorganic Compounds Containing Sulfur and Fluorine," Ind. and Eng. Chem., November 1950, vol. 42, pages 2223–2227.

Barth-Wehrenalp: "A New Method for Producing Perchloryl Fluoride ($ClO_3F$)," J. of Inorganic and Nuclear Chem., April 1956, vol. 2, No. 4, page 266.